United States Patent
Wang et al.

(10) Patent No.: US 12,356,389 B2
(45) Date of Patent: Jul. 8, 2025

(54) POWER OBTAINING METHOD AND APPARATUS AND NODE DEVICE

(71) Applicant: VIVO MOBILE COMMUNICATION CO., LTD., Dongguan (CN)

(72) Inventors: Huan Wang, Dongguan (CN); Jinhua Liu, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 380 days.

(21) Appl. No.: 18/094,197

(22) Filed: Jan. 6, 2023

(65) Prior Publication Data

US 2023/0156684 A1     May 18, 2023

Related U.S. Application Data

(63) Continuation of application No. PCT/CN2021/108081, filed on Jul. 23, 2021.

(30) Foreign Application Priority Data

Jul. 24, 2020 (CN) .......................... 202010724901.0

(51) Int. Cl.
*H04W 72/044* (2023.01)
*H04W 72/563* (2023.01)

(52) U.S. Cl.
CPC ..... *H04W 72/0473* (2013.01); *H04W 72/563* (2023.01)

(58) Field of Classification Search
CPC ........... H04W 72/0473; H04W 72/563; H04W 52/365; H04W 52/367; H04W 52/281; H04W 52/00; H04L 5/001; Y02D 30/70
See application file for complete search history.

(56) References Cited

U.S. PATENT DOCUMENTS 10,582,454 B2 * 3/2020 Babaei .............. H04W 72/0473
10,772,047 B2    9/2020 Chen et al.
(Continued)

FOREIGN PATENT DOCUMENTS

CN      110831135 A    2/2020
JP      2017208582 A    11/2017
(Continued)

OTHER PUBLICATIONS

Ericsson, "IAB MT Tx dynamic range", 3GPP TSG-RAN4 Meeting #92bis, Chongqing, China, Oct. 14-18, 2019, R4-1912014.
Qualcomm Incorporated, "Rel-17 IAB email discussion—report", 3GPP TSG RAN meeting #86, Sitges, Spain, Dec. 9-12, 2019, RP-193094.
(Continued)

*Primary Examiner* — Mohamed A Kamara
(74) *Attorney, Agent, or Firm* — The Webb Law Firm (57) ABSTRACT

A power obtaining method includes: obtaining a configuration power, where the configuration power includes at least one of a first configuration power or a second configuration power, the first configuration power is a power configured for a DU of an IAB node, the second configuration power includes a power configured for an MT in the IAB node and a power configured for at least one cell group of the MT, or the second configuration power includes a power configured for at least one cell group of the MT; and determining a transmission power of the DU and a transmission power of the at least one cell group of the MT, where at least one of the transmission power of the DU or the transmission power of the at least one cell group of the MT is determined according to the configuration power and a transmission priority.

20 Claims, 3 Drawing Sheets

(56) References Cited

U.S. PATENT DOCUMENTS

| | | |
|---|---|---|
| 11,438,847 B2 | 9/2022 | Liu et al. |
| 2017/0280441 A1 | 9/2017 | Shimezawa et al. |
| 2019/0208478 A1* | 7/2019 | Park ................. H04W 72/0453 |
| 2021/0274449 A1 | 9/2021 | Choi et al. |
| 2023/0180147 A1* | 6/2023 | Kowalski ............. H04W 52/46 |
| | | 455/522 |

FOREIGN PATENT DOCUMENTS

| | | |
|---|---|---|
| WO | 2019030904 A1 | 2/2019 |
| WO | 2020060143 A1 | 3/2020 |
| WO | 2020139177 A1 | 7/2020 |

OTHER PUBLICATIONS

Qualcomm, "New WID on Enhancements to Integrated Access and Backhaul", 3GPP TSG RAN meeting #86, Sitges, Spain, Dec. 9-12, 2019, RP-193251.

LG Electronics, "Power control in IAB scenario", 3 GPP TSG RAN WG1 Meeting #94bis, Oct. 8-12, 2018, R1-1810276, Chengdu, China.

Vivo, "Other enhancements to Rel-17 IAB nodes", 3GPP TSG RAN WG1 #102-e, Aug. 17-28, 2020, R1-2005401, e-Meeting.

Vivo, "Other enhancements to Rel-17 IAB nodes", 3GPP TSG RAN WG1 #103-e, Oct. 26-Nov. 13, 2020, R1-2007686, e-Meeting.

ZTE Corporation, "Further discussion on IAB-MT power requirement", 3GPP TSG-RAN WG4 Meeting#95-e, May 25-Jun. 5, 2020, R4-2007401, e-Meeting.

* cited by examiner

POWER OBTAINING METHOD AND APPARATUS AND NODE DEVICE

CROSS-REFERENCE TO RELATED APPLICATIONS

This application is a Bypass Continuation Application of PCT/CN2021/108081 filed Jul. 23, 2021, and claims priority to Chinese Patent Application No. 202010724901.0 filed Jul. 24, 2020, the disclosures of which are hereby incorporated by reference in their entireties.

BACKGROUND OF THE INVENTION

Field of the Invention

The present disclosure relates to the field of communications technologies, and in particular, to a power obtaining method and apparatus and a node device.

Description of Related Art

In the integrated access backhaul (IAB) technology, a distributed unit (DU) of an IAB node and a mobile terminal (MT) may simultaneously perform transmission. In addition, the IAB node may be connected with a plurality of parent IAB nodes and simultaneously transmit information (for example, dual connectivity is performed on IAB MT) to the plurality of parent IAB nodes. Considering the hardware limitation of the IAB node, when a DU, an MT Master Cell Group (MCG), and an MT Secondary Cell Group (SCG) of the IAB node simultaneously perform transmission, the total transmitting power needs to be shared among the DU, the MT MCG, and the MT SCG. However, in the power sharing solution of the prior art, the multi-connection condition in the MT is not considered. Therefore, in the prior art, there is not a solution of performing power sharing among an MT MCG link, an MT SCG link, and the DU.

SUMMARY OF THE INVENTION

According to a first aspect, a power obtaining method is provided, applied to a node device, and the method including:

obtaining a configuration power, where the configuration power includes at least one of a first configuration power or a second configuration power, the first configuration power is a power configured for a distributed unit DU of an integrated access backhaul IAB node, the second configuration power includes a power configured for an MT in the IAB node and a power configured for at least one cell group of the MT, or the second configuration power includes a power configured for at least one cell group of the MT; and determining a transmission power of the DU and a transmission power of the at least one cell group of the MT, where at least one of the transmission power of the DU or the transmission power of the at least one cell group of the MT is determined according to the configuration power and a transmission priority, where the transmission priority includes at least one of a transmission priority of the DU, a transmission priority of the MT, or a transmission priority of the at least one cell group of the MT.

According to a second aspect, a power obtaining apparatus is provided, applied to a node device, and the apparatus including:

a first obtaining module, configured to obtain a configuration power, where the configuration power includes at least one of a first configuration power or a second configuration power, the first configuration power is a power configured for a distributed unit DU of an integrated access backhaul IAB node, the second configuration power includes a power configured for an MT in the IAB node and a power configured for at least one cell group of the MT, or the second configuration power includes a power configured for at least one cell group of the MT; and a first determining module, configured to determine a transmission power of the DU and a transmission power of at least one cell group of the MT, where at least one of the transmission power of the DU or the transmission power of the at least one cell group of the MT is determined according to the configuration power and a transmission priority, where the transmission priority includes at least one of a transmission priority of the DU, a transmission priority of the MT, or a transmission priority of the at least one cell group of the MT.

According to a third aspect, a node device is provided, including a processor, a memory, and a program or instruction stored in the memory and executable on the processor, where the program or instruction, when executed by the processor, implements the steps of the method according to the first aspect.

According to a fourth aspect, a non-transitory readable storage medium is provided, storing a program or instruction, where the program or instruction, when executed by a processor, implements the steps of the method according to the first aspect.

According to a fifth aspect, a chip is provided, including a processor and a communication interface, where the communication interface is coupled to the processor, and the processor is configured to run a program or instruction on a network-side device to implement the method according to the first aspect.

DESCRIPTION OF THE INVENTION

The technical solutions in the embodiments of this disclosure are clearly described below with reference to the accompanying drawings in the embodiments of this disclosure. Apparently, the described embodiments are merely some rather than all of the embodiments of this disclosure. All other embodiments obtained by a person of ordinary skill in the art based on the embodiments of this disclosure shall fall within the protection scope of this disclosure.

The specification and claims of this disclosure, and terms "first" and "second" are used to distinguish similar objects, but are unnecessarily used to describe a specific sequence or order. It may be understood that the data used in such a way is interchangeable in proper circumstances, so that the embodiments of this disclosure can be implemented in other sequences than the sequence illustrated or described herein. In addition, objects distinguished by "first" and "second" are usually of a type, and the number of objects is not limited. For example, a first object may be one or more than one. In addition, in the specification and claims, "and/or" means at least one of the connected objects, and the character "/" generally indicates an "or" relationship between associated objects.

It should be noted that, the technology described in this embodiment of this disclosure is not limited to a long term evolution (LTE)/LTE evolution (LTE-Advanced, LTE-A) system, but may further be used in other wireless communication systems, such as code division multiple access (CDMA), time division multiple access (TDMA), frequency division multiple access (FDMA), orthogonal frequency division multiple access, (OFDMA), single-carrier frequency-division multiple access SC-FDMA), and other systems. The terms "system" and "network" in this embodiment of this disclosure are often used interchangeably, and the described technologies may be used both for the systems and radio technologies mentioned above and may also be used for other systems and radio technologies. However, the following descriptions describe a new radio (NR) system for the objective of being used as an example, and NR terms are used in most of the descriptions below. These technologies may also be applied to applications other than NR system applications, such as a $6^{th}$ generation (6G) communication system.

To enable a person skilled in the art to better understand the present invention, a description of an IAB system is first made below.

Figure 1:
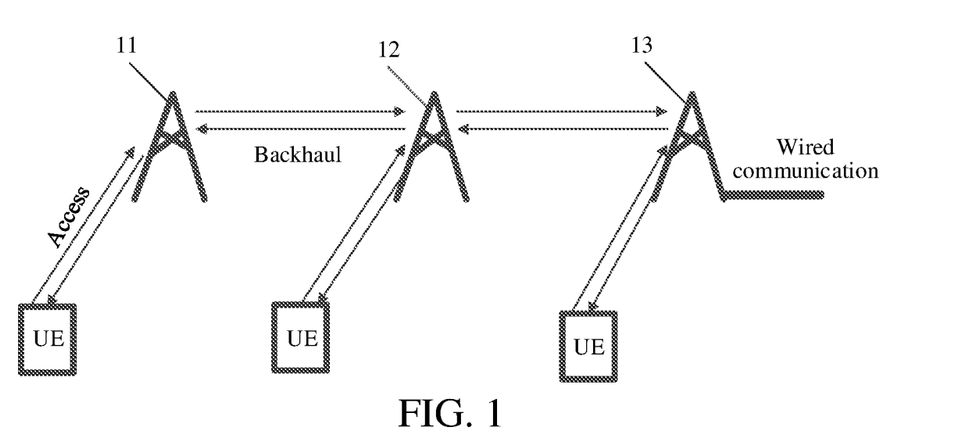
FIG. 1 is a schematic structural diagram of an IAB system.

An integrated access backhaul (IAB) system is a technology on which NR Rel-16 starts to formulate a standard. FIG. 1 is a schematic diagram of an IAB system. An IAB node includes a distributed unit (DU) function part and a mobile terminal (MT) unit function part. Depending on the MT, an access point (that is, IAB node) 11 may find an upstream access point (parent IAB node) 12 and establish a wireless connection with a DU of the upstream access point. The wireless connection is referred to as a backhaul link. After an IAB node establishes a complete backhaul link, the IAB node turns on a DU function of the IAB node, and the DU provides a cell service. That is, the DU may provide an access service for UE. An integrated access backhaul loop includes a donor IAB node 13, and the donor IAB node has a directly connected wired transmission network.

Figure 2:
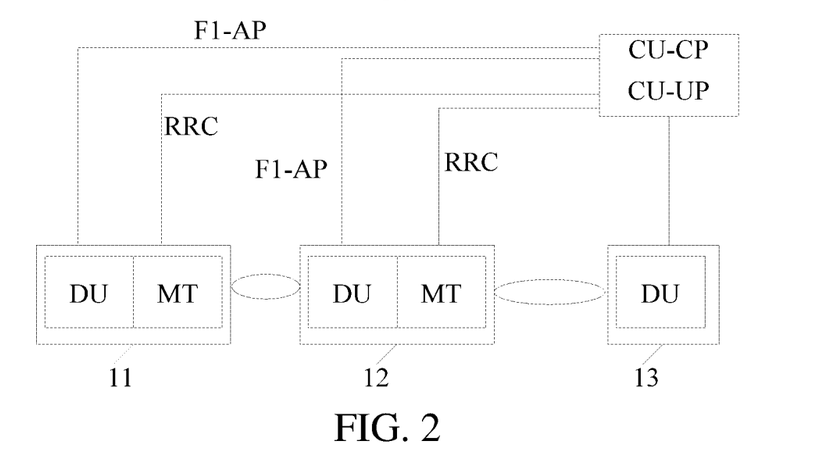
FIG. 2 is a schematic structural diagram of a CU-DU of an IAB system.

FIG. 2 is a structural diagram of a centralized unit-distributed unit (CU-DU) of an IAB system. A CU may also be referred to as a control unit. In an integrated access backhaul loop, DUs of all IAB nodes are connected to a CU node. The CU node configures the DUs through an F1-AP protocol. The CU performs configuration on an MT through an RRC protocol. The donor IAB node does not have the MT functional part.

The introduction of the IAB system is to resolve a condition that a wired transmission network is not deployed in place when access points are densely deployed. That is, when there is not a wired transmission network, the access points may rely on wireless backhaul.

The power obtaining method provided in this embodiment of this disclosure is described in detail below by using some embodiments and application scenarios with reference to the accompanying drawings.

Figure 3:
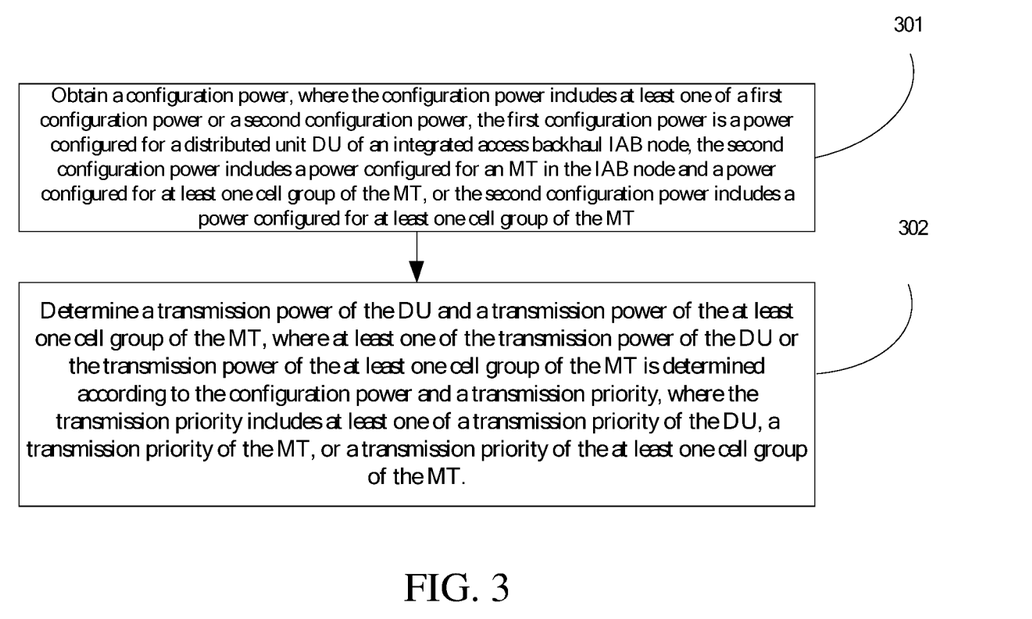
FIG. 3 is a schematic flowchart of a power obtaining method according to an embodiment of this disclosure.

As shown in FIG. 3, this embodiment of this disclosure provides a power obtaining method, applied to a node device. The node device is an IAB node, and the method includes:

obtaining a configuration power, where the configuration power includes at least one of a first configuration power or a second configuration power, the first configuration power is a power configured for a distributed unit DU of an integrated access backhaul IAB node, the second configuration power includes a power configured for an MT in the IAB node and a power configured for at least one cell group of the MT, or the second configuration power includes a power configured for at least one cell group of the MT; and determining a transmission power of the DU and a transmission power of the at least one cell group of the MT, where at least one of the transmission power of the DU or the transmission power of the at least one cell group of the MT is determined according to the configuration power and a transmission priority, where the transmission priority includes at least one of a transmission priority of the DU, a transmission priority of the MT, or a transmission priority of the at least one cell group of the MT.

The transmission priority is determined in at least one of the following manners:

protocol specification, network configuration, or a transmission priority of a physical layer.

For example, a transmission priority between the DU and the MT is specified in a protocol or configured by a network; a transmission priority among the DU, the MT MCG, and the MT SCG is specified in a protocol or configured by a network; or in particular, it is specified in a protocol that a priority of the DU is higher than a transmission priority of any cell group of the MT. In another example, it is specified in a protocol that a transmission priority of the DU and a transmission priority of the cell group of the MT are determined based on a physical channel type of the transmission performed by the DU and the MT. In another example, it is specified in a protocol that a transmission priority of the DU and a transmission priority of the cell group of the MT are determined based on a service type of the transmission performed by the DU and the MT. In another example, transmission of a physical layer with a high priority indicated by DCI is preferentially transmitted.

In addition, network configuration refers to configuration performed through higher layer signaling, such as RRC or F1-C configuration.

In the power obtaining method of this embodiment of this disclosure, a configuration power is obtained; and a transmission power of the DU and/or a transmission power of at least one cell group of the MT is determined according to the configuration power and the transmission priority, thereby implementing dynamic power sharing between the DU and the at least one cell group of the MT, and improving the power efficiency of IAB transmission.

As a first alternative solution, the determining the transmission power of the DU and the transmission power of the at least one cell group of the MT includes:

determining the transmission power of the DU and a transmission power of the MT, where at least one of the transmission power of the DU or the transmission power of the MT is determined according to the configuration power and the transmission priority; and determining the transmission power of the at least one cell group of the MT according to the transmission power of the MT or a preset power fixed value.

In the solution, first, dynamic power distribution is performed between the DU and the MT. For example, dynamic power distribution is performed according to at least one of a maximum power principle or a minimum guaranteed power principle. Then, a conventional power sharing manner is used between at least one cell group of the MT. For example, a semi-persistent power distribution manner or a dynamic power distribution manner is used.

As a first optional implementation, the first configuration power includes $Q_{DU}$, the $Q_{DU}$ is a transmission power or a maximum transmission power configured for the DU, the second configuration power includes $Q_{MT}$, and the $Q_{MT}$ is a transmission power or a maximum transmission power configured for the MT. Optionally, $Q_{DU}+Q_{MT}>P_{total}$, where the $P_{total}$ is a total power of the IAB node, or the $P_{total}$ is a maximum power outputted by a total power of the IAB node, or the transmitter of the IAB node, or the $P_{total}$ is a total transmission power that may be supported by the DU and the MT.

the determining the transmission power of the DU includes:
determining the transmission power of the DU according to a difference between a total power $P_{total}$ of the IAB node and the transmission power of the MT and the $Q_{DU}$ in a case that the transmission priority of the MT is higher than the transmission priority of the DU; or
determining the transmission power of the DU in a case that the transmission priority of the DU is higher than the transmission priority of the MT, where the transmission power of the DU is less than or equal to the $Q_{DU}$.

Illustratively, in a case that the transmission priority of the MT is higher than the transmission priority of the DU, the transmission power of the MT is determined, where the transmission power of the MT is less than or equal to the $Q_{MT}$, and the transmission power of the DU is determined according to a smaller value of a difference between the transmission power of the $P_{total}$ and the MT and the $Q_{DU}$.

A transmission power $pwr_{MT}$ of the MT is first determined, $pwr_{MT} \leq Q_{MT}$, and then, the transmission power of the DU is determined according to min $(Q_{DU}, P_{total}-pwr_{MT})$.

The determining the transmission power of the MT includes:
determining the transmission power of the MT in a case that the transmission priority of the MT is higher than the transmission priority of the DU, where the transmission power of the MT is less than or equal to the $Q_{MT}$; or
determining the transmission power of the MT according to a difference between a total power $P_{total}$ of the IAB node and the transmission power of the DU and the $Q_{MT}$ in a case that the transmission priority of the DU is higher than the transmission priority of the MT.

Illustratively, the transmission power of the DU is first determined in a case that the transmission priority of the DU is higher than the transmission priority of the MT, where the transmission power of the DU is less than or equal to the $Q_{DU}$; and the transmission power of the MT is determined according to a difference between the $P_{total}$ and the transmission power of the DU and the $Q_{MT}$.

A transmission power $pwr_{DU}$ of the DU is first determined, $pwr_{DU} \leq Q_{DU}$, and then, the transmission power of the DU is determined according to min $(Q_{MT}, P_{total}-pwr_{DU})$. In the first optional implementation, the transmission power of the MT and/or the transmission power of the DU is determined according to a maximum power principle.

As a second optional implementation, the first configuration power is a minimum guaranteed power $P_{DU}$ configured for the DU, and the second configuration power is a minimum guaranteed power $P_{MT}$ configured for the MT. Optionally, $P_{DU}+P_{MT} \leq P_{total}$, and
the determining the transmission power of the DU includes:
determining the transmission power of the DU according to a first difference between a total power $P_{total}$ of the IAB node and the transmission power of the MT in a case that the transmission priority of the MT is higher than the transmission priority of the DU; or
determining the transmission power of the DU according to a second difference between a total power $P_{total}$ of the IAB node and the $P_{MT}$ in a case that the transmission priority of the DU is higher than the transmission priority of the MT.

Illustratively, the maximum transmission power of the MT is determined according to a first difference between a total power of the IAB node and $P_{DU}$ in a case that the transmission priority of the MT is higher than the transmission priority of the DU; the transmission power of the MT is determined at least according to the maximum transmission power of the MT; and the transmission power of the DU is determined according to a second difference between a total power of the IAB node and the transmission power of the MT.

The determining the transmission power of the DU includes the following two manners:
manner 1: directly determining the transmission power of the DU; and
manner 2: first determining the maximum transmission power of the DU, and determining the transmission power of the DU according to the maximum transmission power of the DU and downlink transmission scheduled for the DU.

For example, the maximum transmission power $P_{total}-P_{DU}$ of the MT is first determined according to the minimum guaranteed power $P_{DU}$ of the DU, then, the power $pwr_{MT}$ (the transmission power of the MT) required for uplink transmission of the MT is determined according to the scheduled MT transmission and a power control algorithm, and when $pwr_{MT}>P_{total}-P_{DU}$, the $pwr_{MT}$ is set to be $P_{total}-P_{DU}$; then, the maximum transmission power of the DU is determined as $P_{total}-pwr_{MT}$; and next, the transmission power $pwr_{DU}$ of the DU is determined according to downlink transmission scheduled for the DU, and when the $pwr_{DU}$ is greater than $P_{total}-Pwr_{MT}$, the $pwr_{DU}$ is set to be $P_{total}-Pwr_{MT}$.

The determining a transmission power of the MT includes:
determining the transmission power of the MT according to a third difference between a total power $P_{total}$ of the IAB node and the $P_{DU}$ in a case that the transmission priority of the MT is higher than the transmission priority of the DU; or
determining the transmission power of the MT according to a fourth difference between a total power $P_{total}$ of the IAB node and the transmission power of the DU in a case that the transmission priority of the DU is higher than the transmission priority of the MT.

Illustratively, the transmission power of the DU is first determined according to a difference between a total power of the IAB node and $P_{MT}$ in a case that the transmission priority of the DU is higher than the transmission priority of the MT, then, the maximum transmission power of the MT is determined according to a fourth difference between the total power $P_{total}$ of the IAB node and the transmission power of the DU, and the transmission power of the MT is determined at least according to the maximum transmission power of the MT.

The maximum transmission power of the DU may be first determined as $P_{total}-P_{MT}$, and then, the transmission power $pwr_{DU}$ of the DU is determined according to downlink transmission scheduled for the DU, and when the $pwr_{DU}$ is greater than $P_{total}-pwr_{MT}$, the $pwr_{DU}$ is set to be $P_{total}-Pwr_{MT}$; and then, the maximum transmission power of the MT is determined as $P_{total}-Pwr_{DU}$, then, the uplink transmission power $pwr_{MT}$ (the transmission power of the MT) required by the MT is determined according to the uplink transmission scheduled for the MT, and when the $pwr_{MT}$ is greater than $P_{total}-pwr_{DU}$, the $pwr_{MT}$ is set to be $P_{total}-pwr_{DU}$.

Further, the determining the transmission power of the MT includes:
  determining an actual maximum transmission power of the MT; and
  determining the transmission power of the MT at least according to the actual maximum transmission power of the MT.

Optionally, the determining an actual maximum transmission power of the MT includes:
  in a case that there is a $P_{cmax}$ in the MT, selecting a smaller value of the third difference and the $P_{cmax}$ as the actual maximum transmission power of the MT.

When there is the $P_{cmax}$ in the MT, the maximum transmission power of the MT is min ($P_{cmax}$, $P_{total}-P_{DU}$). That is, when the required transmission power of the MT is greater than min ($P_{cmax}$, $P_{total}-P_{DU}$), the transmission power that is used is min ($P_{cmax}$, $P_{total}-P_{DU}$).

Alternatively, in a case that there is the $P_{cmax}$ in the MT, selecting a smaller value of the fourth difference and the $P_{cmax}$ as the actual maximum transmission power of the MT, where the $P_{cmax}$ is a maximum transmission power of the MT that is specified in a protocol or pre-configured.

When there is the $P_{cmax}$ in the MT, the maximum transmission power of the MT is min ($P_{cmax}$, $P_{total}-pwr_{DU}$). That is, when the required transmission power of the MT is greater than min ($P_{cmax}$, $P_{total}-pwr_{DU}$), the transmission power that is used is min ($P_{cmax}$, $P_{total}-pwr_{DU}$).

In the second optional implementation, the transmission power of the MT and/or the transmission power of the DU is determined according to a minimum guaranteed power principle.

As a third optional implementation, the first configuration power includes $Q_{DU}$ and/or $P_{DU}$, and the second configuration power includes $Q_{MT}$ and/or $P_{MT}$, where the $Q_{DU}$ is a transmission power or a maximum transmission power configured for the DU, and the $P_{DU}$ is a minimum guaranteed power configured for the DU; the $Q_{MT}$ is a transmission power or a maximum transmission power configured for the MT, and the $P_{MT}$ is a minimum guaranteed power configured for the MT; and the determining the transmission power of the DU includes:
  determining the transmission power of the DU according to a difference between a total power $P_{total}$ of the IAB node and the transmission power of the MT and the $Q_{DU}$ in a case that the transmission priority of the MT is higher than the transmission priority of the DU; or
  determining the transmission power of the DU according to a difference between a total power $P_{total}$ of the IAB node and the $P_{MT}$ and the $Q_{DU}$ in a case that the transmission priority of the DU is higher than the transmission priority of the MT.

Illustratively, the maximum transmission power of the MT may be first determined according to a difference between a total power $P_{total}$ of the IAB node and $P_{DU}$ and $Q_{MT}$ in a case that the transmission priority of the MT is higher than the transmission priority of the DU; and the transmission power of the MT is determined at least according to the maximum transmission power of the MT, and then, the transmission power of the DU is determined according to a difference between a total power $P_{total}$ of the IAB node and the transmission power of the MT and the $Q_{DU}$.

The maximum transmission power of the MT is first determined as min ($Q_{MT}$, $P_{total}-P_{DU}$) according to the minimum guaranteed power $P_{DU}$ of the DU and $Q_{MT}$, then, the uplink transmission power $pwr_{MT}$ (the transmission power of the MT) required by the MT is determined according to the uplink transmission and a power control parameter scheduled for the MT, and when the $pwr_{MT}$ is greater than min ($Q_{MT}$, $P_{total}-P_{DU}$), the $pwr_{MT}$ is set to be min ($Q_{MT}$, $P_{total}-P_{DU}$); and then, the transmission power of the DU is determined as min ($Q_{DU}$, $P_{total}-pwr_{MT}$).

Optionally, a smaller value of a difference between a total power $P_{total}$ of the IAB node and $P_{MT}$ and $Q_{DU}$ is selected as the maximum transmission power of the DU in a case that the transmission priority of the DU is higher than the transmission priority of the MT; and the transmission power of the DU is determined at least according to the maximum transmission power of the DU.

The maximum transmission power of the DU is first determined as min ($Q_{DU}$, $P_{total}-P_{MT}$) according to the minimum guaranteed power $P_{MT}$ of the MT and $Q_{DU}$, then, the downlink transmission power $pwr_{DU}$ (the transmission power of the DU) required by the DU is determined according to the downlink transmission and a power control parameter scheduled for the DU, and when the $pwr_{DU}$ is greater than min ($Q_{DU}$, $P_{total}-P_{MT}$), the $pwr_{DU}$ is set to be min ($Q_{DU}$, $P_{total}-P_{MT}$)
  the determining a transmission power of the MT includes:
    determining the transmission power of the MT according to a difference between a total power $P_{total}$ of the IAB node and the $P_{DU}$ and the $Q_{MT}$ in a case that the transmission priority of the MT is higher than the transmission priority of the DU; or
    determining the transmission power of the MT according to a difference between a total power Pr of the IAB node and the transmission power of the DU and the $Q_{MT}$ in a case that the transmission priority of the DU is higher than the transmission priority of the MT.

Illustratively, in a case that the transmission priority of the MT is higher than the transmission priority of the DU, a smaller value of a difference between a total power $P_{total}$ of the IAB node and $P_{DU}$ and $Q_{MT}$ is selected as the maximum transmission power of the MT, and the transmission power of the MT is determined at least according to the maximum transmission power of the MT.

The maximum transmission power of the MT is first determined as min ($Q_{MT}$, $P_{total}-P_{DU}$) according to the minimum guaranteed power $P_{DU}$ of the DU and $Q_{MT}$, then, the uplink transmission power $pwr_{MT}$ (the transmission power of the MT) required by the MT is determined according to the uplink transmission and a power control parameter scheduled for the MT, and when the $pwr_{MT}$ is greater than min ($Q_{MT}$, $P_{total}-P_{DU}$), the $pwr_{MT}$ is set to be min ($Q_{MT}$, $P_{total}-P_{DU}$).

Optionally, a smaller value of a difference between a total power $P_{total}$ of the IAB node and $P_{MT}$ and $Q_{DU}$ is first selected as the maximum transmission power of the DU in a case that the transmission priority of the DU is higher than the transmission priority of the MT; the transmission power of the DU is determined at least according to the maximum transmission power of the DU; and then, the transmission power of the MT is determined according to a difference between the $P_{total}$ and the transmission power of the DU and the $Q_{MT}$.

The maximum transmission power of the DU is first determined as min ($Q_{DU}$, $P_{total}$–$P_{MT}$) according to the minimum guaranteed power $P_{MT}$ of the MT and $Q_{DU}$, then, the downlink transmission power $pwr_{DU}$ (the transmission power of the DU) required by the DU is determined according to the downlink transmission and a power control parameter scheduled for the DU, and when the $pwr_{DU}$ is greater than min ($Q_{DU}$, $P_{total}$–$P_{MT}$), the $pwr_{DU}$ is set to be min ($Q_{DU}$, $P_{total}$–$P_{MT}$); and then, the transmission power of the MT is determined as min ($Q_{MT}$, $P_{total}$–$pwr_{DU}$).

The transmission power of the DU and/or the transmission power of the MT is determined in a manner of a combination of a maximum power principle and a minimum guaranteed power principle.

Optionally, when the $Q_{MT}$ configured by the network for the MT is greater than the pre configured $P_{cmax}$, the maximum transmission power of the MT may be greater than the $P_{cmax}$. That is, when the MT determines the maximum transmission power, a maximum power value configured through dedicated signaling may cover a predetermined maximum power value.

Optionally, when the $Q_{DU}$ configured by the network for the DU is greater than the pre-configured $P_0$, the maximum transmission power of the DU may be greater than the $P_0$. That is, when the DU determines the maximum transmission power, a maximum power value configured through dedicated signaling may cover a predetermined maximum power value. The $P_0$ may be a maximum transmission power of the DU specified by RAN4.

In the first optional solution, the second configuration power includes a maximum transmission power $Q_{MCG}$ configured for an MT master cell group and a maximum transmission power $Q_{SCG}$ configured for an MT secondary cell group; and the transmission power of the MT includes a maximum transmission power configured for the MT, a maximum transmission power of the MT specified in a protocol, or an actual maximum transmission power of the MT; and the determining the transmission power of the at least one cell group of the MT according to the transmission power of the MT or a preset power fixed value includes:
according to the $Q_{MCG}$ and the $Q_{SCG}$, obtaining, according to a preset power sharing rule, the maximum transmission power of the MT master cell group and the maximum transmission power of the MT secondary cell group, where
the preset power sharing rule includes a first power sharing rule, a second power sharing rule, and a third power sharing rule;
the first power sharing rule is that dynamic power sharing is performed in a case that a sum of the $Q_{MCG}$ and the $Q_{SCG}$ is greater than a target power;
the second power sharing rule is that semi-persistent power sharing is performed in a case that a sum of the $Q_{MCG}$ and the $Q_{SCG}$ is less than or equal to the target power; and
the third power sharing rule is that dynamic power sharing is performed, where the target power is the transmission power of the MT or the preset power fixed value.

Power sharing of the MCG and the SCG under dual connectivity (DC) is described below.

If the UE is in a state of dual connectivity, a transmission power of the UE may be shared between an MCG link and an SCG link. The power sharing between the MCG link and the SCG link may be divided into semi-persistent sharing and dynamic power sharing.

For the semi-persistent power sharing, a sum of a maximum uplink transmission power configured for the MCG link and the SCG link is less than or equal to a total transmission power of the UE, and the MCG and the SCG are respectively limited by the maximum transmission power configured for the MCG and the SCG when performing power control. For dual connectivity of the NR-NR, the maximum transmission power configured for the MCG link and the SCG link is only applicable at a moment when the MCG link and the SCG link simultaneously perform transmission.

For the dynamic power sharing, LTE DC uses the minimum guaranteed power principle. Minimum guaranteed transmission powers are respectively configured for the MCG link and the SCG link, and a sum of the two is less than or equal to the maximum transmission power of the UE. The MCG link and the SCG link may share the remaining power part (that is, the total power minus the remaining power of the sum of the minimum guaranteed transmission power of the MCG link and the minimum guaranteed transmission power of the SCG link). NR-NR DC uses the maximum power principle. Maximum transmission powers are respectively configured for the MCG link and the SCG link, and the sum of the two may be greater than the maximum transmission power of the UE. When the sum of the power required by the simultaneously transmitted MCG link and SCG link is greater than the maximum transmission power of the UE, the UE needs to preferentially distribute a transmission power to the MCG link to ensure the transmission of the MCG link. However, the transmission power of the MCG link is still limited by the configured maximum transmission power, and the transmission power of the SCG link is limited by the smaller one of the configured maximum transmission power and the remaining transmission power (that is, the total power minus the transmission power of the MCG link).

Further, optionally, before the obtaining the maximum transmission power of the MT master cell group and the maximum transmission power of the MT secondary cell group, the method further includes:
adjusting at least one of the $Q_{MCG}$ or the $Q_{SCG}$ according to a difference between the preset power fixed value and the transmission power of the MT in a case that the preset power fixed value is different from the transmission power of the MT.

In this embodiment of this disclosure, the total transmission power $Q_{MCG}+Q_{SCG}$ between cell groups of the MT is limited by the maximum transmission power of the MT ($P_{cmax}$ or $Q_{MT}$) or limited by the preset power fixed value $P_{fixed}$ ($P_{fixed}=P_{cmax}$ or $P_{total}$) that is specified in a protocol or configured. The $P_{cmax}$ is the maximum transmission power of the MT specified in a protocol, and the $P_{total}$ is the maximum transmission power of the configured MT.

In a case that the preset power fixed value is different from the maximum transmission power of the MT, as an optional implementation, either the $Q_{MCG}$ or the $Q_{SCG}$ is adjusted. For example, if a difference between the preset power fixed value and the maximum transmission power of the MT is 10 watts, that is, the preset power fixed value is 10 watts greater than a maximum transmission power value of the MT, then, the $Q_{MCG}$ is reduced by 10 watts, or the $Q_{SCG}$ is reduced by 10 watts. In another example, if a difference between the preset power fixed value and the maximum transmission power of the MT is −10 watts, that is, the preset power fixed value is 10 watts less than the maximum transmission power value of the MT, then, the $Q_{MCG}$ is increased by 10 watts, or the $Q_{SCG}$ is increased by 10 watts. That is, an adjustment value of either $Q_{MCG}$ or $Q_{SCG}$ is the same as the difference.

In a case that the preset power fixed value is different from the maximum transmission power of the MT, as another optional implementation, both the $Q_{MCG}$ and the $Q_{SCG}$ are adjusted. Illustratively, according to the difference between the preset power fixed value and the maximum transmission power of the MT, the $Q_{MCG}$ is adjusted according to a first adjustment ratio, and the $Q_{SCG}$ is adjusted according to a second adjustment ratio. The first adjustment ratio and the second adjustment ratio may be the same or different. Optionally, a sum of the first adjustment ratio and the second adjustment ratio is 1. For example, the two adjustment ratios are 0.5 respectively, that is, the $Q_{MCG}$ and the $Q_{SCG}$ equally share the difference; and Optionally, the first adjustment ratio and the second adjustment ratio are determined according to the difference. For example, if the preset power fixed value is increased by 10% relative to the maximum transmission power of the MT, it is determined that both the first adjustment ratio and the second adjustment ratio are 10%. That is, both the $Q_{MCG}$ and the $Q_{SCG}$ are increased by 10%.

In addition, in a case that the MCG and the SCG of the MT do not simultaneously perform transmission, the maximum power of the MCG and the maximum power of the SCG are limited by the maximum transmission power of the MT.

As a second optional solution, in this embodiment of this disclosure, a transmission power of the DU and a transmission power of at least one cell group of the MT are directly determined.

Dynamic power distribution is performed between the DU and at least one cell group of the MT. Illustratively, the transmission power of the DU and/or the transmission power of at least one cell group of the MT is determined according to at least one of the maximum power principle or the minimum guaranteed power principle. For example, the transmission power of the DU, the transmission power of the MT master cell group, and the transmission power of the MT secondary cell group are determined.

In the second optional solution, as the first optional implementation, the first configuration power is $Q_{DU}$, the $Q_{DU}$ is a transmission power or a maximum transmission power configured for the DU, the second configuration power includes $Q_1$ and $Q_2$, the $Q_1$ is a transmission power or a maximum transmission power configured for an MT master cell group, and the $Q_2$ is a transmission power or a maximum transmission power configured for an MT secondary cell group. Optionally, $Q_{DU}+Q_1+Q_2>P_{total}$, where the $P_{total}$ is the total power of the IAB node.

the determining the transmission power of the DU and the transmission power of the at least one cell group of the MT includes:
in a case that a transmission priority of a first unit y in the IAB node is higher than a transmission priority of a second unit x in the IAB node, determining a transmission power or an actual maximum transmission power of the second unit according to min ($Q_x$, $P_{total}$−sum($pwr_y$)), where the first unit is at least one of the DU, the MT secondary cell group, or the MT master cell group in the IAB node, the second unit includes the DU, the MT secondary cell group, or the MT master cell group, and the first unit is different from the second unit; and the $Q_x$ represents a maximum transmission power or a transmission power configured for the second unit, the $Q_x$ is the $Q_{DU}$, the $Q_1$, or the $Q_2$, the $pwr_y$ represents a transmission power of the first unit, and the $P_{total}$ is a total power of the IAB node.

For example, the first unit y is the DU, the second unit x is the MT master cell group, and the transmission priority of the MT secondary cell group is lower than the transmission priority of the MT master cell group. Then, the transmission power of the MT master cell group is min ($Q_1$, P−sum ($pwr_{DU}$)). That is, the transmission power of the DU is first determined, and then, the transmission power of the MT master cell group is determined according to $Q_1$ and P−sum ($pwr_{DU}$).

In another example, the first unit is the DU and the MT master cell group, and the second unit is the MT secondary cell group. Then, the transmission power $pwr_{DU}$ of the DU and the transmission power $pwr_{MCG}$ of the MT master cell group are first determined, and the transmission power of the MT secondary cell group is finally determined according to min ($Q_2$, P−sum($pwr_{Du}$+$pwr_{MCG}$)).

The maximum power principle is used for determining the transmission power of the DU and/or the transmission power of at least one cell group of the MT.

In addition, when $Q_1+Q_2>P_{cmax}$, the transmission power of the DU and/or the transmission power of at least one cell group of the MT may be determined in the following manner.

In a case that a transmission priority of a first unit y in the IAB node is higher than a transmission priority of a second unit x in the IAB node, and $Q_1+Q_2>P_{cmax}$, a transmission power or an actual maximum transmission power of the second unit is determined according to min ($P_{cmax}$−sum ($pwr_k$), $Q_x$, and $P_{total}$−sum($pwr_y$)), where the first unit is at least one of the DU, the MT secondary cell group, or the MT master cell group in the IAB node, the second unit is a cell group in the MT, and the first unit is different from the second unit; the $pwr_k$ represents a transmission power of a k unit in the MT, a transmission priority of the k unit is higher than the transmission priority of the second unit, and the $P_{cmax}$ is a maximum transmission power of the MT that is specified in a protocol; and the $Q_x$ represents a maximum transmission power or a transmission power configured for the second unit, the $Q_x$ is the $Q_{DU}$, $Q_1$, or the $Q_2$, and the $pwr_y$ represents a transmission power of the first unit.

As the second optional implementation, the first configuration power includes $P_{DU}$, and the second configuration power includes $P_1$ and $P_2$, where the $P_{DU}$ is a minimum guaranteed power configured for the DU, the $P_1$ is a minimum guaranteed power configured for an MT master cell group, and the $P_2$ is a minimum guaranteed power configured for an MT secondary cell group. Optionally, $P_{DU}+P_1+P_2 \leq P_{total}$, where the $P_{total}$ is the total power of the IAB node; and the determining the transmission power of the DU and the transmission power of the at least one cell group of the MT includes:
in a case that a transmission priority of a first unit y in the IAB node is higher than a transmission priority of a second unit x in the IAB node, and the transmission priority of the second unit x is higher than a transmission priority of a third unit z in the IAB node, determining a transmission power or an actual maximum transmission power of the second unit according to $P_{total}-\text{sum}(pwr_y)-\text{sum}(P_z)$, where the first unit is the DU, the MT secondary cell group, or the MT master cell group in the IAB node, the second unit is the DU, the MT secondary cell group, or the MT master cell group in the IAB node, the third unit is the DU, the MT secondary cell group, or the MT master cell group in the IAB node, and the first unit, the second unit, and the third unit are different; and the $pwr_y$ represents a transmission power of the first unit, the $P_z$ represents a minimum guaranteed power configured for the third unit, and the $P_z$ is equal to the $P_{DU}$, the $P_1$, or the $P_2$.

Assuming that x, y, and z respectively correspond to the MT master cell group, the MT secondary cell group, and the DU, a priority of y is higher than that of x, and a priority of x is higher than that of z.

The maximum transmission power or transmission power of y is first determined as $P_{total}-P_x-P_z$, and the transmission power $pwr_y$ of y is determined under the restriction;

the maximum transmission power or transmission power of x is then determined as $P_{total}-pwr_y-P_z$, and the transmission power $pwr_x$ of x is determined under the restriction; and the maximum transmission power or transmission power of z is finally determined as $P_{total}-pwr_y-pwr_x$, and the transmission power $pwr_z$ of z is determined under the restriction.

The minimum guaranteed power principle is used for determining the transmission power of the DU and/or the transmission power of at least one cell group of the MT.

As a third optional implementation, the first configuration power includes $Q_{DU}$ and $P_{DU}$, and the second configuration power includes $Q_1$, $Q_2$, $P_1$, and $P_2$, where the $Q_{DU}$ is a transmission power or a maximum transmission power configured for the DU, and the $P_{DU}$ is a minimum guaranteed power configured for the DU; the $Q_1$ is a transmission power or a maximum transmission power configured for an MT master cell group, the $Q_2$ is a transmission power or a maximum transmission power configured for an MT secondary cell group, the $P_1$ is a minimum guaranteed power configured for the MT master cell group, and the $P_2$ is a minimum guaranteed power configured for the MT secondary cell group; and the determining the transmission power of the DU and the transmission power of the at least one cell group of the MT includes:

in a case that a transmission priority of a first unit y in the IAB node is higher than a transmission priority of a second unit x in the IAB node, and the transmission priority of the second unit x is higher than a transmission priority of a third unit z in the IAB node, determining a transmission power or an actual maximum transmission power of the second unit according to min $\{Q_x, P_{total}-\text{sum}(pwr_y)-\text{sum}(P_z)\}$, where the first unit is the DU, the MT secondary cell group, or the MT master cell group in the IAB node, the second unit is the DU, the MT secondary cell group, or the MT master cell group in the IAB node, the third unit is the DU, the MT secondary cell group, or the MT master cell group in the IAB node, and the first unit, the second unit, and the third unit are different; and the $pwr_y$ represents a transmission power of the first unit, the $P_z$ represents a minimum guaranteed power configured for the third unit, the $P_z$ is equal to the $P_{DU}$, the $P_1$, or the $P_2$, the $Q_x$ represents a maximum transmission power or a transmission power configured for the second unit, and the $Q_x$ is the $Q_{DU}$, the $Q_1$, or the $Q_2$.

Assuming that x, y, and z respectively correspond to the MT master cell group, the MT secondary cell group, and the DU, a priority of y is higher than that of x, and a priority of x is higher than that of z.

The maximum transmission power or transmission power of y is first determined as min $(Q_y, P_{total}-P_x-P_z)$, and the transmission power $pwr_y$ of y is determined under the restriction;

the maximum transmission power or transmission power of x is then determined as min $(Q_x, P_{total}-pwr_y-P_z)$, and the transmission power $pwr_x$ of x is determined under the restriction; and the maximum transmission power or transmission power of z is finally determined as min $(Q_z, P_{total}-pwr_x-pwr_y)$, and the transmission power $pwr_z$ of z is determined under the restriction.

In addition, in a case that $Q_1+Q_2>P_{max}$, the transmission power or the actual maximum transmission power of the second unit may be determined in the following manner.

In a case that a transmission priority of a first unit y in the IAB node is higher than a transmission priority of a second unit x in the IAB node, the transmission priority of the second unit x is higher than a transmission priority of a third unit z in the IAB node, and $Q_1+Q_2>P_{cmax}$, a transmission power or an actual maximum transmission power of the second unit is determined according to min $(P_{max}-\text{sum}(pwr_k)-\text{sum}(P_s), Q_x,$ and $P_{total}-\text{sum}(pwr_y)-\text{sum}(P_z))$, where the first unit is the DU, the MT secondary cell group, or the MT master cell group in the IAB node, the second unit is a cell group in the MT, the third unit is the DU, the MT secondary cell group, or the MT master cell group in the IAB node, and the first unit, the second unit, and the third unit are different;

the $pwr_y$ represents a transmission power of the first unit, the $P_z$ represents a minimum guaranteed power configured for the third unit, the $P_z$ is equal to the $P_{DU}$, the $P_1$, or the $P_2$, the $Q_x$ represents a maximum transmission power or a transmission power configured for the second unit, and the $Q_x$ is the $Q_{DU}$, the $Q_1$, or the $Q_2$; the $pwr_k$ represents a transmission power of a k unit in the MT, a transmission priority of the k unit is higher than the transmission priority of the second unit, and the $P_{cmax}$ is a maximum transmission power of the MT that is specified in a protocol; and the $P_s$ represents a minimum guaranteed power configured for an s unit in the MT, and a transmission priority of the s unit is lower than the transmission priority of the second unit.

Optionally, after the determining the transmission power of the DU and the transmission power of the at least one cell group of the MT, the method further includes:

reporting at least one power headroom report PHR, where a power cap calculated in the PHR is assumed to be at least one of the following:

at least one configured maximum transmission power;
at least one maximum power specified in a protocol;
at least one actual maximum transmission power; or
at least one configured minimum guaranteed power.

For the first optional solution, when the PHR is reported, at least for a moment of the power sharing, the MT may report one or more PHRs.

Assuming that the maximum transmission power of the cell group of the MT is the theoretically achievable maximum transmission power (for example, $P_{total}$, $P_{cmax}$, $Q_{MT}$, min ($Q_{MT}$, $P_{total}$-pwr$_{DU}$), $P_{total}$-$P_{DU}$, $P_{total}$-pwr$_{DU}$, min ($Q_{MT}$, $P_{total}$-$P_{DU}$), $Q_{MCG}$, $Q_{SCG}$, a value of $Q_{MCG}$ adjusted down or up or according to a specific ratio, and a value of $Q_{SCG}$ adjusted down or up or according to a specific ratio), the actual maximum transmission power (for example, the maximum transmission power of the MT excluding the transmission power occupied by a higher priority CG), and/or, the minimum guaranteed power value ($P_{MT}$).

For the second optional solution, when the PHR is reported, at least for a moment of the power sharing, the MT may report one or more PHRs.

Assuming that the maximum transmission power of the cell group of the MT is the theoretically achievable maximum transmission power (for example, $P_{total}$, $P_{cmax}$, $Q_1$, or $Q_2$), the actual maximum transmission power (for example, the maximum transmission power of the MT excluding the transmission power occupied by a cell group (CG) with a high priority, and/or the maximum transmission power of the MT excluding the minimum guaranteed power of a cell group (CG) with a low priority), and/or the minimum guaranteed power value.

In this embodiment of this disclosure, a plurality of PHRs may be simultaneously reported, or different PHRs may be reported in different transmission conditions.

It is to be noted that, in this embodiment of this disclosure, the minimum guaranteed power has the same meaning indicated by the minimum guaranteed power in the existing minimum guaranteed power principle, and the actual maximum transmission power may be understood as the remaining power obtained by subtracting the transmission power of one of the units from the total transmission power.

In the power obtaining method of this embodiment of this disclosure, a configuration power is obtained; and a transmission power of the DU and/or a transmission power of at least one cell group of the MT is determined according to the configuration power and the transmission priority, thereby implementing dynamic power sharing between the DU and at least one cell group of the MT, and improving the power efficiency of IAB transmission.

It is to be noted that, in the power obtaining method provided in this embodiment of this disclosure, the execution entity may be a power obtaining apparatus, or a control module configured to perform the power obtaining method in the power obtaining apparatus. In this embodiment of this disclosure, the power obtaining apparatus performing the power obtaining method is used as an example to describe the power obtaining apparatus provided in this disclosure.

Figure 4:
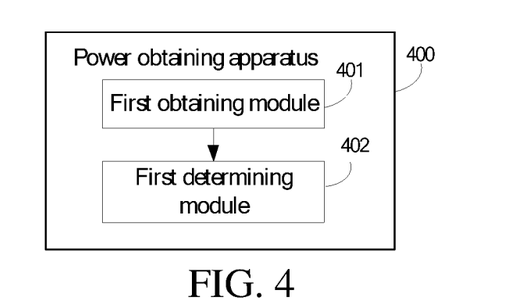
FIG. 4 is a schematic diagram of a module of a power obtaining apparatus according to an embodiment of this disclosure.

As shown in FIG. 4, this embodiment of this disclosure provides a power obtaining apparatus 400, applied to a node device, and the apparatus including:

a first obtaining module 401, configured to obtain a configuration power, where the configuration power includes at least one of a first configuration power or a second configuration power, the first configuration power is a power configured for a distributed unit DU of an integrated access backhaul IAB node, the second configuration power includes a power configured for an MT in the IAB node and a power configured for at least one cell group of the MT, or the second configuration power includes a power configured for at least one cell group of the MT; and a first determining module 402, configured to determine a transmission power of the DU and a transmission power of at least one cell group of the MT, where at least one of the transmission power of the DU or the transmission power of the at least one cell group of the MT is determined according to the configuration power and a transmission priority, where the transmission priority includes at least one of a transmission priority of the DU, a transmission priority of the MT, or a transmission priority of the at least one cell group of the MT.

The power obtaining apparatus of this embodiment of this disclosure includes obtaining a configuration power; and determining a transmission power of the DU and/or a transmission power of at least one cell group of the MT according to the configuration power and the transmission priority, thereby implementing dynamic power sharing between the DU and at least one cell group of the MT, and improving the power efficiency of IAB transmission.

In the power obtaining apparatus of this embodiment of this disclosure, the first determining module includes:

a first determining submodule, configured to determine the transmission power of the DU and the transmission power of the MT, where at least one of the transmission power of the DU or the transmission power of the MT is determined according to the configuration power and the transmission priority; and a second determining submodule, configured to determine the transmission power of at least one cell group of the MT according to the transmission power of the MT or a preset power fixed value.

In the power obtaining apparatus of this embodiment of this disclosure, the first configuration power is a transmission power or a maximum transmission power $Q_{DU}$ configured for the DU, and the second configuration power is a transmission power or a maximum transmission power $Q_{MT}$ configured for the MT; and the first determining submodule is configured to determine the transmission power of the DU according to a difference between a total power $P_{total}$ of the IAB node and the transmission power of the MT and the $Q_{DU}$ in a case that the transmission priority of the MT is higher than the transmission priority of the DU; or determine the transmission power of the DU in a case that the transmission priority of the DU is higher than the transmission priority of the MT, where the transmission power of the DU is less than or equal to the $Q_{DU}$.

In the power obtaining apparatus of this embodiment of this disclosure, the first configuration power is a transmission power or a maximum transmission power $Q_{DU}$ configured for the DU, and the second configuration power is a transmission power or a maximum transmission power $Q_{MT}$ configured for the MT; and the first determining submodule is configured to determine the transmission power of the MT in a case that the transmission priority of the MT is higher than the transmission priority of the DU, where the transmission power of the MT is less than or equal to the $Q_{MT}$; or determine the transmission power of the MT according to a difference between a total power $P_{total}$ of the IAB node and the transmission power of the DU and the $Q_{MT}$ in a case that the transmission priority of the DU is higher than the transmission priority of the MT.

In the power obtaining apparatus of this embodiment of this disclosure, $Q_{DU}$+$Q_{MT}$>$P_{total}$.

In the power obtaining apparatus of this embodiment of this disclosure, the first configuration power is a minimum guaranteed power $P_{DU}$ configured for the DU, and the second configuration power is a minimum guaranteed power $P_{MT}$ configured for the MT; and the first determining submodule is configured to determine the transmission power of the DU according to a first difference between a total power $P_{total}$ of the IAB node and the transmission power of the MT in a case that the transmission priority of the MT is higher than the transmission priority of the DU; or determine the transmission power of the DU according to a second difference between a total power $P_{total}$ of the IAB node and $P_{MT}$ in a case that the transmission priority of the DU is higher than the transmission priority of the MT.

In the power obtaining apparatus of this embodiment of this disclosure, the first configuration power is a minimum guaranteed power $P_{DU}$ configured for the DU, and the second configuration power is a minimum guaranteed power $P_{MT}$ configured for the MT; and the first determining submodule is configured to determine the transmission power of the MT according to a third difference between a total power $P_{total}$ of the IAB node and $P_{DU}$ in a case that the transmission priority of the MT is higher than the transmission priority of the DU; or determine the transmission power of the MT according to a fourth difference between a total power $P_{total}$ of the IAB node and the transmission power of the DU in a case that the transmission priority of the DU is higher than the transmission priority of the MT.

In the power obtaining apparatus of this embodiment of this disclosure, the first determining submodule includes:

a first determining unit, configured to determine an actual maximum transmission power of the MT; and a second determining unit, configured to determine the transmission power of the MT at least according to the actual maximum transmission power of the MT.

In the power obtaining apparatus of this embodiment of this disclosure, the first determining unit is configured to select, in a case that there is a $P_{cmax}$ in the MT, a smaller value of the third difference and the $P_{cmax}$ as the actual maximum transmission power of the MT; or in a case that there is the $P_{cmax}$ in the MT, select a smaller value of the fourth difference and the $P_{cmax}$ as the actual maximum transmission power of the MT, where the $P_{cmax}$ is a maximum transmission power of the MT that is specified in a protocol or pre-configured.

In the power obtaining apparatus of this embodiment of this disclosure, the first configuration power includes $Q_{DU}$ and/or $P_{DU}$, and the second configuration power includes $Q_{MT}$ and/or $P_{MT}$, where the $Q_{DU}$ is a transmission power or a maximum transmission power configured for the DU, and the $P_{DU}$ is a minimum guaranteed power configured for the DU; the $Q_{MT}$ is a transmission power or a maximum transmission power configured for the MT, and the $P_{MT}$ is a minimum guaranteed power configured for the MT; and the first determining submodule is configured to determine the transmission power of the DU according to a difference between a total power $P_{total}$ of the IAB node and the transmission power of the MT and the $Q_{DU}$ in a case that the transmission priority of the MT is higher than the transmission priority of the DU; or determine the transmission power of the DU according to a difference between a total power $P_{total}$ of the IAB node and $P_{MT}$ and $Q_{DU}$ in a case that the transmission priority of the DU is higher than the transmission priority of the MT.

In the power obtaining apparatus of this embodiment of this disclosure, the first configuration power includes $Q_{DU}$ and/or $P_{DU}$, and the second configuration power includes $Q_{MT}$ and/or $P_{MT}$, where the $Q_{DU}$ is a transmission power or a maximum transmission power configured for the DU, and the $P_{DU}$ is a minimum guaranteed power configured for the DU; the $Q_{MT}$ is a transmission power or a maximum transmission power configured for the MT, and the $P_{MT}$ is a minimum guaranteed power configured for the MT; and the first determining submodule is configured to determine the transmission power of the MT according to a difference between a total power $P_{total}$ of the IAB node and $P_{DU}$ and $Q_{MT}$ in a case that the transmission priority of the MT is higher than the transmission priority of the DU; or determine the transmission power of the MT according to a difference between a total power $P_{total}$ of the IAB node and the transmission power of the DU and the $Q_{MT}$ in a case that the transmission priority of the DU is higher than the transmission priority of the MT.

In the power obtaining apparatus of this embodiment of this disclosure, the second configuration power includes a maximum transmission power $Q_{MCG}$ configured for an MT master cell group and a maximum transmission power $Q_{SCG}$ configured for an MT secondary cell group; and the transmission power of the MT includes a maximum transmission power configured for the MT, a maximum transmission power of the MT specified in a protocol, or an actual maximum transmission power of the MT; and the second determining submodule is configured to according to the $Q_{MCG}$ and the $Q_{SCG}$, obtain, according to a preset power sharing rule, the maximum transmission power of the MT master cell group and the maximum transmission power of the MT secondary cell group, where the preset power sharing rule includes a first power sharing rule, a second power sharing rule, and a third power sharing rule;

the first power sharing rule is that dynamic power sharing is performed in a case that a sum of the $Q_{MCG}$ and the $Q_{SCG}$ is greater than a target power;

the second power sharing rule is that semi-persistent power sharing is performed in a case that a sum of the $Q_{MCG}$ and the $Q_{SCG}$ is less than or equal to the target power; and the third power sharing rule is that dynamic power sharing is performed, where the target power is the transmission power of the MT or the preset power fixed value.

In the power obtaining apparatus of this embodiment of this disclosure, the first determining module further includes: an adjustment submodule, configured to adjust, before the second determining submodule obtains the maximum transmission power of the MT master cell group and the maximum transmission power of the MT secondary cell group, at least one of the $Q_{MCG}$ or the $Q_{SCG}$ according to a difference between the preset power fixed value and the transmission power of the MT in a case that the preset power fixed value is different from the transmission power of the MT.

In the power obtaining apparatus of this embodiment of this disclosure, the first configuration power is $Q_{DU}$, the $Q_{DU}$ is a transmission power or a maximum transmission power configured for the DU, the second configuration power includes $Q_1$ and $Q_2$, the $Q_1$ is a transmission power or a maximum transmission power configured for an MT master cell group, and the $Q_2$ is a transmission power or a maximum transmission power configured for an MT secondary cell group; and the first determining module is configured to determine, in a case that a transmission priority of a first unit y in the IAB node is higher than a transmission priority of a second unit x in the IAB node, a transmission power or an actual maximum transmission power of the second unit according to min ($Q_x$, $P_{total}$−sum($pwr_y$)), where the first unit is at least one of the DU, the MT secondary cell group, or the MT master cell group in the IAB node, the second unit includes the DU, the MT secondary cell group, or the MT master cell group, and the first unit is different from the second unit; and the $Q_x$ represents a maximum transmission power or a transmission power configured for the second unit, the $Q_x$ is the $Q_{DU}$, the $Q_1$, or the $Q_2$, the $pwr_y$ represents a transmission power of the first unit, and the $P_{total}$ is a total power of the IAB node.

In the power obtaining apparatus of this embodiment of this disclosure, $Q_{DU}+Q_1+Q_2>P_{total}$.

In the power obtaining apparatus of this embodiment of this disclosure, the first configuration power includes $Q_{DU}$, the $Q_{DU}$ is a transmission power or a maximum transmission power configured for the DU, the second configuration power includes $Q_1$ and $Q_2$, the $Q_1$ is a transmission power or a maximum transmission power configured for an MT master cell group, and the $Q_2$ is a transmission power or a maximum transmission power configured for an MT secondary cell group; and the first determining module is configured to determine, in a case that a transmission priority of a first unit y in the IAB node is higher than a transmission priority of a second unit x in the IAB node, and $Q_1+Q_2>P_{cmax}$, a transmission power or an actual maximum transmission power of the second unit according to min ($P_{cmax}$−sum($pwr_k$), $Q_x$, and $P_{total}$−sum($pwr_y$)), where the first unit is at least one of the DU, the MT secondary cell group, or the MT master cell group in the IAB node, the second unit is a cell group in the MT, and the first unit is different from the second unit; the $pwr_k$ represents a transmission power of a k unit in the MT, a transmission priority of the k unit is higher than the transmission priority of the second unit, and the $P_{cmax}$ is a maximum transmission power of the MT specified in a protocol; and the $Q_x$ represents a maximum transmission power or a transmission power configured for the second unit, the $Q_x$ is the $Q_{DU}$, $Q_1$, or the $Q_2$, and the $pwr_y$ represents a transmission power of the first unit.

In the power obtaining apparatus of this embodiment of this disclosure, the first configuration power includes $P_{DU}$, and the second configuration power includes $P_1$ and $P_2$, where the $P_{DU}$ is a minimum guaranteed power configured for the DU, the $P_1$ is a minimum guaranteed power configured for an MT master cell group, and the $P_2$ is a minimum guaranteed power configured for an MT secondary cell group; and the first determining module is configured to determine, in a case that a transmission priority of a first unit y in the IAB node is higher than a transmission priority of a second unit x in the IAB node, and the transmission priority of the second unit x is higher than a transmission priority of a third unit z in the IAB node, a transmission power or an actual maximum transmission power of the second unit according to $P_{total}$−sum($pwr_y$)−sum($P_z$), where the first unit is the DU, the MT secondary cell group, or the MT master cell group in the IAB node, the second unit is the DU, the MT secondary cell group, or the MT master cell group in the IAB node, the third unit is the DU, the MT secondary cell group, or the MT master cell group in the IAB node, and the first unit, the second unit, and the third unit are different; and the $pwr_y$ represents a transmission power of the first unit, the $P_z$ represents a minimum guaranteed power configured for the third unit, and the $P_z$ is equal to the $P_{DU}$, the $P_1$, or the $P_2$.

In the power obtaining apparatus of this embodiment of this disclosure, the first configuration power includes $Q_{DU}$ and $P_{DU}$, and the second configuration power includes $Q_1$, $Q_2$, $P_1$, and $P_2$, where the $Q_{DU}$ is a transmission power or a maximum transmission power configured for the DU, and the $P_{DU}$ is a minimum guaranteed power configured for the DU; the $Q_1$ is a transmission power or a maximum transmission power configured for an MT master cell group, the $Q_2$ is a transmission power or a maximum transmission power configured for an MT secondary cell group, the $P_1$ is a minimum guaranteed power configured for the MT master cell group, and the $P_2$ is a minimum guaranteed power configured for the MT secondary cell group; and the first determining module is configured to determine, in a case that a transmission priority of a first unit y in the IAB node is higher than a transmission priority of a second unit x in the IAB node, and the transmission priority of the second unit x is higher than a transmission priority of a third unit z in the IAB node, a transmission power or an actual maximum transmission power of the second unit according to min {$Q_x$, $P_{total}$−sum($pwr_y$)−sum($P_z$)}, where the first unit is the DU, the MT secondary cell group, or the MT master cell group in the IAB node, the second unit is the DU, the MT secondary cell group, or the MT master cell group in the IAB node, the third unit is the DU, the MT secondary cell group, or the MT master cell group in the IAB node, and the first unit, the second unit, and the third unit are different; and the $pwr_y$ represents a transmission power of the first unit, the $P_z$ represents a minimum guaranteed power configured for the third unit, the $P_z$ is equal to the $P_{DU}$, the $P_1$, or the $P_2$, the $Q_x$ represents a maximum transmission power or a transmission power configured for the second unit, and the $Q_x$ is the $Q_{DU}$, the $Q_1$, or the $Q_2$.

In the power obtaining apparatus of this embodiment of this disclosure, the first configuration power includes $Q_{DU}$ and $P_{DU}$, and the second configuration power includes $Q_1$, $Q_2$, $P_1$, and $P_2$, where the $Q_{DU}$ is a transmission power or a maximum transmission power configured for the DU, and the $P_{DU}$ is a minimum guaranteed power configured for the DU; the $Q_1$ is a transmission power or a maximum transmission power configured for an MT master cell group, the $Q_2$ is a transmission power or a maximum transmission power configured for an MT secondary cell group, the $P_1$ is a minimum guaranteed power configured for the MT master cell group, and the $P_2$ is a minimum guaranteed power configured for the MT secondary cell group; and the first determining module is configured to determine, in a case that a transmission priority of a first unit y in the IAB node is higher than a transmission priority of a second unit x in the IAB node, the transmission priority of the second unit x is higher than a transmission priority of a third unit z in the IAB node, and $Q_1+Q_2>P_{cmax}$, a transmission power or an actual maximum transmission power of the second unit according to min ($P_{cmax}$−sum($pwr_k$)−sum($P_s$), $Q_x$, and $P_{total}$−sum($pwr_y$)−sum($P_z$)), where the first unit is the DU, the MT secondary cell group, or the MT master cell group in the IAB node, the second unit is a cell group in the MT, the third unit is the DU, the MT secondary cell group, or the MT master cell group in the IAB node, and the first unit, the second unit, and the third unit are different;

the $pwr_y$ represents a transmission power of the first unit, the $P_z$ represents a minimum guaranteed power configured for the third unit, the $P_z$ is equal to the $P_{DU}$, the $P_1$, or the $P_2$, the $Q_x$ represents a maximum transmission power or a transmission power configured for the second unit, and the $Q_x$ is the $Q_{DU}$, the $Q_1$, or the $Q_2$;

the $pwr_k$ represents a transmission power of a k unit in the MT, a transmission priority of the k unit is higher than the transmission priority of the second unit, and the $P_{cmax}$ is a maximum transmission power of the MT that is specified in a protocol; and the $P_s$ represents a minimum guaranteed power configured for an s unit in the MT, and a transmission priority of the s unit is lower than the transmission priority of the second unit.

The power obtaining apparatus of this embodiment of this disclosure further includes:

a reporting module, configured to report, after the first determining module determines the transmission power of the DU and the transmission power of at least one cell group of the MT, at least one power headroom report PHR, where a power cap calculated in the PHR is assumed to be at least one of the following:

at least one configured maximum transmission power;
at least one maximum power specified in a protocol;
at least one actual maximum transmission power; or
at least one configured minimum guaranteed power.

In the power obtaining apparatus of this embodiment of this disclosure, the transmission priority is determined in at least one of the following manners:

protocol specification;
network configuration; or
a transmission priority of a physical layer.

In the power obtaining apparatus of this embodiment of this disclosure, a configuration power is obtained; and a transmission power of the DU and/or a transmission power of at least one cell group of the MT is determined according to the configuration power and the transmission priority, thereby implementing dynamic power sharing between the DU and at least one cell group of the MT, and improving the power efficiency of IAB transmission.

The power obtaining apparatus of this embodiment of this disclosure may be an apparatus, and may also be a component, an integrated circuit, or a chip in a node device.

The power obtaining apparatus provided in this embodiment of this disclosure may implement various processes of the method embodiments in FIG. 1 to FIG. 3, and implement the same technical effect, which will not be described in detail herein again to avoid repetition.

Figure 5:
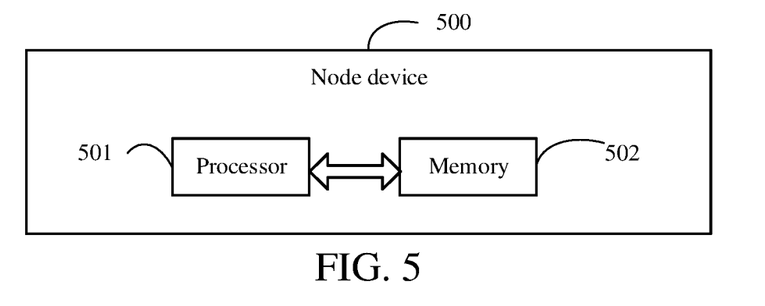
FIG. 5 is a structural block diagram 1 of a node device according to an embodiment of this disclosure.

Optionally, as shown in FIG. 5, this embodiment of this disclosure further provides a node device 500, including a processor 501, a memory 502, and a program or instruction stored in the memory 502 and executable on the processor 501, the program or instruction, when executed by the processor 501, implements the various processes of the power obtaining method embodiment, and may implement the same technical effect. To avoid repetition, details are not described herein again.

Figure 6:
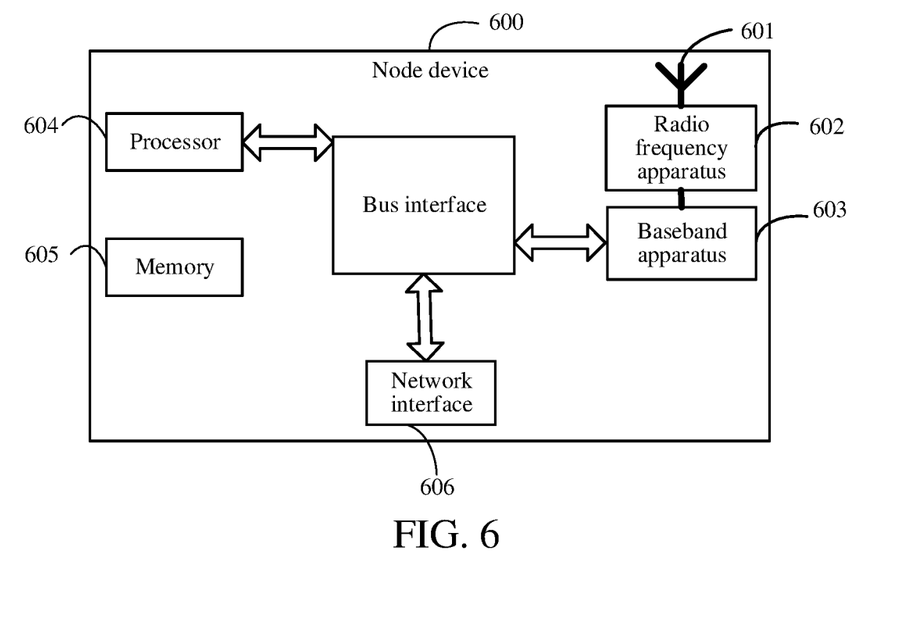
FIG. 6 is a structural block diagram 2 of a node device according to an embodiment of this disclosure.

As shown in FIG. 6, this embodiment of this disclosure further provides a node device. The node device 600 includes: an antenna 601, a radio frequency apparatus 602, and a baseband apparatus 603. The antenna 601 is connected with the radio frequency apparatus 602. In an uplink direction, the radio frequency apparatus 602 receives information through the antenna 601, and transmits the received information to the baseband apparatus 603 for processing. In a downlink direction, the baseband apparatus 603 performs processing on the to-be-transmitted information, and transmits the to-be-transmitted information to the radio frequency apparatus 602. After performing processing on the received information, the radio frequency apparatus 602 transmits the received information out through the antenna 601.

The frequency band processing apparatus may be located in the baseband apparatus 603, and the method performed by the node device in the foregoing embodiments may be implemented in the baseband apparatus 603. The baseband apparatus 603 includes a processor 604 and a memory 605.

The baseband apparatus 603 may include, for example, at least one baseband board, and a plurality of chips are arranged on the baseband board. As shown in FIG. 6, for example, one of the chips is a processor 604, and is connected with the memory 605, to invoke the program in the memory 605, and to perform the operation shown in the foregoing method embodiments.

The baseband apparatus 603 may further include a network interface 606 used for exchanging information with the radio frequency apparatus 602. For example, the interface is a common public radio interface (CPRI).

Illustratively, the node device of this embodiment of the present invention further includes: an instruction or program stored in the memory 605 and executable on the processor 604. The processor 604 invokes the instruction or program in the memory 605 to perform the method performed by each module shown in FIG. 4, and implements the same technical effect, which will not be described in detail herein again to avoid repetition.

This embodiment of this disclosure further provides a non-transitory readable storage medium storing therein a program or instruction. The program or instruction, when executed by a processor, implements various processes of the power obtaining method embodiment, and the same technical effects may be achieved, which will not be described in detail herein again to avoid repetition.

The processor is a processor in the node device described in the foregoing embodiment. The non-transitory readable storage medium includes a non-transitory computer-readable storage medium, for example, a Read-Only Memory (ROM), a Random Access Memory (RAM), a magnetic disk, an optical disc or the like.

This embodiment of this disclosure further provides a chip, including a processor and a communication interface, where the communication interface is coupled to the processor. The processor is configured to run a program or instruction on a node device to implement various processes of the power obtaining method embodiment described above, and the same technical effects may be achieved, which will not be described in detail herein again to avoid repetition.

It should be understood that, the chip mentioned in this embodiment of this disclosure may further be referred to as a system-level chip, a system chip, a chip system, a system on chip, or the like.

It is to be noted that, the term "include", "comprise", or any other variation thereof in this specification intends to cover a non-exclusive inclusion, which specifies the presence of stated processes, methods, objects, or apparatuses, but does not preclude the presence or addition of one or more other processes, methods, objects, or apparatuses. Without more limitations, elements defined by the sentence "including one" does not exclude that there are still other same elements in the processes, methods, objects, or apparatuses. In addition, it should be noted that the scope of the methods and apparatuses in the implementations of this disclosure is not limited to performing functions in the order shown or discussed, and may further include performing functions in a substantially simultaneous manner or in a reverse order according to the functions involved, for example, the described methods may be performed in an order different from the order described, and various steps may be added, omitted, or combined. In addition, features described with reference to some examples may be combined in other examples.

Through the foregoing description on the implementations, a person skilled in the art can clearly learn that the foregoing embodiment methods may be implemented by using software in combination with a necessary universal hardware platform. Certainly, the embodiment methods may also be implemented by using hardware, but the former is a better implementation in many cases. Based on such an understanding, the technical solutions of the present invention essentially, or the part contributing to the prior art, may be presented in the form of a software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in the embodiments of the present invention.

Although the embodiments of this disclosure have been described above with reference to the accompanying drawings, this disclosure is not limited to the implementations described above, and the embodiments described above are merely exemplary and not limitative. A person of ordinary skill in the art may make various variations under the teaching of this disclosure without departing from the spirit of this disclosure and the protection scope of the claims, and such variations shall all fall within the protection scope of this disclosure.

What is claimed is:

1. A power obtaining method, performed by a node device and comprising:
obtaining a configuration power, wherein the configuration power comprises at least one of a first configuration power or a second configuration power, the first configuration power is a power configured for a distributed unit (DU) of an integrated access backhaul (IAB) node, the second configuration power comprises a power configured for a mobile terminal (MT) in the IAB node and a power configured for at least one cell group of the MT, or the second configuration power comprises a power configured for at least one cell group of the MT; and
determining a transmission power of the DU and a transmission power of the at least one cell group of the MT; wherein
at least one of the transmission power of the DU or the transmission power of the at least one cell group of the MT is determined according to the configuration power and a transmission priority, wherein
the transmission priority comprises at least one of a transmission priority of the DU, a transmission priority of the MT, or a transmission priority of the at least one cell group of the MT.

2. The power obtaining method according to claim 1, wherein the determining the transmission power of the DU and the transmission power of the at least one cell group of the MT comprises:

determining the transmission power of the DU and a transmission power of the MT; wherein
at least one of the transmission power of the DU or the transmission power of the MT is determined according to the configuration power and the transmission priority; and
determining the transmission power of the at least one cell group of the MT according to the transmission power of the MT or a preset power fixed value.

3. The power obtaining method according to claim 2, wherein the first configuration power is a transmission power or a maximum transmission power $Q_{DU}$ configured for the DU, and the second configuration power is a transmission power or a maximum transmission power $Q_{MT}$ configured for the MT; and
the determining the transmission power of the DU comprises:
determining the transmission power of the DU according to a difference between a total power $P_{total}$ of the IAB node and the transmission power of the MT and the $Q_{DU}$ in a case that the transmission priority of the MT is higher than the transmission priority of the DU; or
determining the transmission power of the DU in a case that the transmission priority of the DU is higher than the transmission priority of the MT, wherein the transmission power of the DU is less than or equal to the $Q_{DU}$.

4. The power obtaining method according to claim 2, wherein the first configuration power is a transmission power or a maximum transmission power $Q_{DU}$ configured for the DU, and the second configuration power is a transmission power or a maximum transmission power $Q_{MT}$ configured for the MT; and
the determining the transmission power of the MT comprises:
determining the transmission power of the MT in a case that the transmission priority of the MT is higher than the transmission priority of the DU; wherein
the transmission power of the MT is less than or equal to the $Q_{MT}$; or
determining the transmission power of the MT according to a difference between a total power $P_{total}$ of the IAB node and the transmission power of the DU and the $Q_{MT}$ in a case that the transmission priority of the DU is higher than the transmission priority of the MT.

5. The power obtaining method according to claim 3, wherein $Q_{DU}+Q_{MT}>P_{total}$.

6. The power obtaining method according to claim 2, wherein the first configuration power is a minimum guaranteed power $P_{DU}$ configured for the DU, and the second configuration power is a minimum guaranteed power $P_{MT}$ configured for the MT; and
the determining the transmission power of the DU comprises:
determining the transmission power of the DU according to a first difference between a total power $P_{total}$ of the IAB node and the transmission power of the MT in a case that the transmission priority of the MT is higher than the transmission priority of the DU; or
determining the transmission power of the DU according to a second difference between a total power $P_{total}$ of the IAB node and the $P_{MT}$ in a case that the transmission priority of the DU is higher than the transmission priority of the MT.

7. The power obtaining method according to claim 2, wherein the first configuration power is a minimum guaranteed power $P_{DU}$ configured for the DU, and the second configuration power is a minimum guaranteed power $P_{MT}$ configured for the MT; and the determining the transmission power of the MT comprises:

determining the transmission power of the MT according to a third difference between a total power $P_{total}$ of the IAB node and the $P_{DU}$ in a case that the transmission priority of the MT is higher than the transmission priority of the DU; or determining the transmission power of the MT according to a fourth difference between a total power $P_{total}$ of the IAB node and the transmission power of the DU in a case that the transmission priority of the DU is higher than the transmission priority of the MT.

8. The power obtaining method according to claim 7, wherein the determining the transmission power of the MT comprises:

determining an actual maximum transmission power of the MT; and determining the transmission power of the MT at least according to the actual maximum transmission power of the MT.

9. The power obtaining method according to claim 8, wherein the determining the actual maximum transmission power of the MT comprises:

in a case that there is a $P_{cmax}$ in the MT, selecting a smaller value of the third difference and the $P_{cmax}$ as the actual maximum transmission power of the MT; or in a case that there is the $P_{cmax}$ in the MT, selecting a smaller value of the fourth difference and the $P_{cmax}$ as the actual maximum transmission power of the MT, wherein the $P_{cmax}$ is a maximum transmission power of the MT that is specified in a protocol or pre-configured.

10. The power obtaining method according to claim 2, wherein the first configuration power comprises $Q_{DU}$ and/or $P_{DU}$, and the second configuration power comprises $Q_{MT}$ and/or $P_{MT}$, wherein the $Q_{DU}$ is a transmission power or a maximum transmission power configured for the DU, and the $P_{DU}$ is a minimum guaranteed power configured for the DU; the $Q_{MT}$ is a transmission power or a maximum transmission power configured for the MT, and the $P_{MT}$ is a minimum guaranteed power configured for the MT; and the determining the transmission power of the DU comprises:

determining the transmission power of the DU according to a difference between a total power $P_{total}$ of the IAB node and the transmission power of the MT and the $Q_{DU}$ in a case that the transmission priority of the MT is higher than the transmission priority of the DU; or determining the transmission power of the DU according to a difference between a total power $P_{total}$ of the IAB node and the $P_{MT}$ and the $Q_{DU}$ in a case that the transmission priority of the DU is higher than the transmission priority of the MT.

11. The power obtaining method according to claim 2, wherein the first configuration power comprises $Q_{DU}$ and/or $P_{DU}$, and the second configuration power comprises $Q_{MT}$ and/or $P_{MT}$, wherein the $Q_{DU}$ is a transmission power or a maximum transmission power configured for the DU, and the $P_{DU}$ is a minimum guaranteed power configured for the DU; the $Q_{MT}$ is a transmission power or a maximum transmission power configured for the MT, and the $P_{MT}$ is a minimum guaranteed power configured for the MT; and the determining the transmission power of the MT comprises:

determining the transmission power of the MT according to a difference between a total power $P_{total}$ of the IAB node and the $P_{DU}$ and the $Q_{MT}$ in a case that the transmission priority of the MT is higher than the transmission priority of the DU; or determining the transmission power of the MT according to a difference between a total power $P_{total}$ of the IAB node and the transmission power of the DU and the $Q_{MT}$ in a case that the transmission priority of the DU is higher than the transmission priority of the MT.

12. The power obtaining method according to claim 2, wherein the second configuration power comprises a maximum transmission power $Q_{MCG}$ configured for an MT master cell group and a maximum transmission power $Q_{SCG}$ configured for an MT secondary cell group; and the transmission power of the MT comprises a maximum transmission power configured for the MT, a maximum transmission power of the MT specified in a protocol, or an actual maximum transmission power of the MT; and the determining the transmission power of the at least one cell group of the MT according to the transmission power of the MT or the preset power fixed value comprises:

according to the $Q_{MCG}$ and the $Q_{SCG}$, obtaining, according to a preset power sharing rule, the maximum transmission power of the MT master cell group and the maximum transmission power of the MT secondary cell group; wherein the preset power sharing rule comprises a first power sharing rule, a second power sharing rule, and a third power sharing rule;

the first power sharing rule is that dynamic power sharing is performed in a case that a sum of the $Q_{MCG}$ and the $Q_{SCG}$ is greater than a target power;

the second power sharing rule is that semi-persistent power sharing is performed in a case that a sum of the $Q_{MCG}$ and the $Q_{SCG}$ is less than or equal to the target power; and the third power sharing rule is that dynamic power sharing is performed, wherein the target power is the transmission power of the MT or the preset power fixed value.

13. The power obtaining method according to claim 12, wherein before the obtaining the maximum transmission power of the MT master cell group and the maximum transmission power of the MT secondary cell group, the method further comprises:

adjusting at least one of the $Q_{MCG}$ or the $Q_{SCG}$ according to a difference between the fixed preset power fixed value and the transmission power of the MT in a case that the preset power fixed value is different from the transmission power of the MT.

14. The power obtaining method according to claim 1, wherein the first configuration power is $Q_{DU}$, the $Q_{DU}$ is a transmission power or a maximum transmission power configured for the DU, the second configuration power comprises $Q_1$ and $Q_2$, the $Q_1$ is a transmission power or a maximum transmission power configured for an MT master cell group, and the $Q_2$ is a transmission power or a maximum transmission power configured for an MT secondary cell group; and the determining the transmission power of the DU and the transmission power of the at least one cell group of the MT comprises:

in a case that a transmission priority of a first unit y in the IAB node is higher than a transmission priority of a second unit x in the IAB node, determining a transmission power or an actual maximum transmission power of the second unit according to min ($Q_x$, $P_{total}$−sum($pwr_y$)), wherein the first unit is at least one of the DU, the MT secondary cell group, or the MT master cell group in the IAB node, the second unit comprises the DU, the MT secondary cell group, or the MT master cell group, and the first unit is different from the second unit; and the $Q_x$ represents a maximum transmission power or a transmission power configured for the second unit, the $Q_x$ is the $Q_{DU}$, the $Q_1$, or the $Q_2$, the $pwr_y$ represents a transmission power of the first unit, and the total is $P_{total}$ power of the IAB node.

15. The power obtaining method according to claim 14, wherein $Q_{DU}+Q_1+Q_2>P_{total}$.

16. The power obtaining method according to claim 1, wherein the first configuration power comprises $Q_{DU}$, the $Q_{DU}$ is a transmission power or a maximum transmission power configured for the DU, the second configuration power comprises $Q_1$ and $Q_2$, the $Q_1$ is a transmission power or a maximum transmission power configured for an MT master cell group, and the $Q_2$ is a transmission power or a maximum transmission power configured for an MT secondary cell group; and the determining the transmission power of the DU and the transmission power of the at least one cell group of the MT comprises:

in a case that a transmission priority of a first unit y in the IAB node is higher than a transmission priority of a second unit x in the IAB node, and $Q_1+Q_2>P_{cmax}$, determining a transmission power or an actual maximum transmission power of the second unit according to min ($P_{cmax}$−sum($pwr_k$), $Q_x$, and $P_{total}$−sum($pwr_y$)); wherein the first unit is at least one of the DU, the MT secondary cell group, or the MT master cell group in the IAB node, the second unit is a cell group in the MT, and the first unit is different from the second unit; the $pwr_k$ represents a transmission power of a k unit in the MT, a transmission priority of the k unit is higher than the transmission priority of the second unit, and the $P_{cmax}$ is a maximum transmission power of the MT that is specified in a protocol; and the $Q_x$ represents a maximum transmission power or a transmission power configured for the second unit, the $Q_x$ is the $Q_{DU}$, the $Q_1$, or the $Q_2$, and the $pwr_y$ represents a transmission power of the first unit; and/or the first configuration power comprises $P_{DU}$, and the second configuration power comprises $P_1$ and $P_2$, wherein the $P_{DU}$ is a minimum guaranteed power configured for the DU, the $P_1$ is a minimum guaranteed power configured for an MT master cell group, and the $P_2$ is a minimum guaranteed power configured for an MT secondary cell group; and the determining the transmission power of the DU and the transmission power of the at least one cell group of the MT comprises:

in a case that a transmission priority of a first unit y in the IAB node is higher than a transmission priority of a second unit x in the IAB node, and the transmission priority of the second unit x is higher than a transmission priority of a third unit z in the IAB node, determining a transmission power or an actual maximum transmission power of the second unit according to $P_{total}$−sum($pwr_y$)−sum($P_z$); wherein the first unit is the DU, the MT secondary cell group, or the MT master cell group in the IAB node, the second unit is the DU, the MT secondary cell group, or the MT master cell group in the IAB node, the third unit is the DU, the MT secondary cell group, or the MT master cell group in the IAB node, and the first unit, the second unit, and the third unit are different; and the $pwr_y$ represents a transmission power of the first unit, the $P_z$ represents a minimum guaranteed power configured for the third unit, and the $P_z$ is equal to the $P_{DU}$, the $P_1$, or the $P_2$; and/or the first configuration power comprises $Q_{DU}$ and $P_{DU}$, and the second configuration power comprises $Q_1$, $Q_2$, $P_1$, and $P_2$, wherein the $Q_{DU}$ is a transmission power or a maximum transmission power configured for the DU, and the $P_{DU}$ is a minimum guaranteed power configured for the DU; the $Q_1$ is a transmission power or a maximum transmission power configured for an MT master cell group, the $Q_2$ is a transmission power or a maximum transmission power configured for an MT secondary cell group, the $P_1$ is a minimum guaranteed power configured for the MT master cell group, and the $P_2$ is a minimum guaranteed power configured for the MT secondary cell group; and the determining the transmission power of the DU and the transmission power of the at least one cell group of the MT comprises:

in a case that a transmission priority of a first unit y in the IAB node is higher than a transmission priority of a second unit x in the IAB node, and the transmission priority of the second unit x is higher than a transmission priority of a third unit z in the IAB node, determining a transmission power or an actual maximum transmission power of the second unit according to min $\{Q_x, P_{total}−\text{sum}(pwr_y)−\text{sum}(P_z)\}$; wherein the first unit is the DU, the MT secondary cell group, or the MT master cell group in the IAB node, the second unit is the DU, the MT secondary cell group, or the MT master cell group in the IAB node, the third unit is the DU, the MT secondary cell group, or the MT master cell group in the IAB node, and the first unit, the second unit, and the third unit are different; and the $pwr_y$ represents a transmission power of the first unit, the $P_z$ represents a minimum guaranteed power configured for the third unit, the $P_z$ is equal to the $P_{DU}$, the $P_1$, or the $P_2$, the $Q_x$ represents a maximum transmission power or a transmission power configured for the second unit, and the $Q_x$ is the $Q_{DU}$, the $Q_1$, or the $Q_2$; and/or the first configuration power comprises $Q_{DU}$ and $P_{DU}$, and the second configuration power comprises $Q_1$, $Q_2$, $P_1$, and $P_2$, wherein the $Q_{DU}$ is a transmission power or a maximum transmission power configured for the DU, and the $P_{DU}$ is a minimum guaranteed power configured for the DU; the $Q_1$ is a transmission power or a maximum transmission power configured for an MT master cell group, the $Q_2$ is a transmission power or a maximum transmission power configured for an MT secondary cell group, the $P_1$ is a minimum guaranteed power configured for the MT master cell group, and the $P_2$ is a minimum guaranteed power configured for the MT secondary cell group; and the determining a transmission power of the DU and the transmission power of the at least one cell group of the MT comprises:

in a case that a transmission priority of a first unit y in the IAB node is higher than a transmission priority of a second unit x in the IAB node, the transmission priority of the second unit x is higher than a transmission priority of a third unit z in the IAB node, and $Q_1+Q_2>P_{cmax}$, determining a transmission power or an actual maximum transmission power of the second unit according to min ($P_{cmax}$-sum($pwr_k$)-sum($P_s$), $Q_x$, and $P_{total}$-sum($pwr_y$)-sum($P_z$)); wherein the first unit is the DU, the MT secondary cell group, or the MT master cell group in the IAB node, the second unit is a cell group in the MT, the third unit is the DU, the MT secondary cell group, or the MT master cell group in the IAB node, and the first unit, the second unit, and the third unit are different;

the $pwr_y$ represents a transmission power of the first unit, the $P_z$ represents a minimum guaranteed power configured for the third unit, the $P_z$ is equal to the $P_{DU}$, the $P_1$, or the $P_2$, the $Q_x$ represents a maximum transmission power or a transmission power configured for the second unit, and the $Q_x$ is the $Q_{DU}$, the $Q_1$, or the $Q_2$; the $pwr_k$ represents a transmission power of a k unit in the MT, a transmission priority of the k unit is higher than the transmission priority of the second unit, and the P cmax is a maximum transmission power of the MT that is specified in a protocol; and the $P_s$ represents a minimum guaranteed power configured for an s unit in the MT, and a transmission priority of the s unit is lower than the transmission priority of the second unit.

17. The power obtaining method according to claim 1, wherein after the determining the transmission power of the DU and the transmission power of the at least one cell group of the MT, the method further comprises:

reporting at least one power headroom report (PHR); wherein a power cap calculated in the PHR is assumed to be at least one of following:

at least one configured maximum transmission power;
at least one maximum power specified in a protocol;
at least one actual maximum transmission power; or
at least one configured minimum guaranteed power.

18. The power obtaining method according to claim 1, wherein the transmission priority is determined in at least one of following manners:

protocol specification;
network configuration; or
a transmission priority of a physical layer.

19. A node device, comprising a processor, a memory, and a program or instructions stored in the memory and executable on the processor, wherein the program or instructions, when executed by the processor, causes the node device to perform:

obtaining a configuration power, wherein the configuration power comprises at least one of a first configuration power or a second configuration power, the first configuration power is a power configured for a distributed unit (DU) of an integrated access backhaul (IAB) node, the second configuration power comprises a power configured for a mobile terminal (MT) in the IAB node and a power configured for at least one cell group of the MT, or the second configuration power comprises a power configured for at least one cell group of the MT; and determining a transmission power of the DU and a transmission power of the at least one cell group of the MT; wherein at least one of the transmission power of the DU or the transmission power of the at least one cell group of the MT is determined according to the configuration power and a transmission priority, wherein the transmission priority comprises at least one of a transmission priority of the DU, a transmission priority of the MT, or a transmission priority of the at least one cell group of the MT.

20. A non-transitory readable storage medium, storing a program or instructions, wherein the program or instructions, when executed by a processor of a node device, causes the node device to perform:

obtaining a configuration power, wherein the configuration power comprises at least one of a first configuration power or a second configuration power, the first configuration power is a power configured for a distributed unit (DU) of an integrated access backhaul (IAB) node, the second configuration power comprises a power configured for an mobile terminal (MT) in the IAB node and a power configured for at least one cell group of the MT, or the second configuration power comprises a power configured for at least one cell group of the MT; and determining a transmission power of the DU and a transmission power of the at least one cell group of the MT; wherein at least one of the transmission power of the DU or the transmission power of the at least one cell group of the MT is determined according to the configuration power and a transmission priority, wherein the transmission priority comprises at least one of a transmission priority of the DU, a transmission priority of the MT, or a transmission priority of the at least one cell group of the MT.

* * * * *